United States Patent [19]
Fukatsu et al.

[11] Patent Number: 5,576,724
[45] Date of Patent: Nov. 19, 1996

[54] VEHICULAR EXTREME POSITION DISPLAY SYSTEM

[75] Inventors: Yoshiaki Fukatsu, Nagoya; Shunichi Ogawa, Toyota, both of Japan

[73] Assignee: Nippondenso Co., Ltd., Kariya, Japan

[21] Appl. No.: 69,709

[22] Filed: Jun. 1, 1993

[30] Foreign Application Priority Data

Jun. 1, 1992 [JP] Japan ................................ 4-140430
May 24, 1993 [JP] Japan ................................ 5-121463

[51] Int. Cl.⁶ .................................................. G09G 5/00
[52] U.S. Cl. ................................. 345/7; 345/9; 359/13
[58] Field of Search ............................. 345/6, 8, 9, 7; 350/3, 81; 340/980, 435, 436, 457.2, 457.3; 359/13, 14, 630

[56] References Cited

U.S. PATENT DOCUMENTS

| | | | |
|---|---|---|---|
| 3,875,557 | 4/1975 | Lawson | 340/457.2 |
| 4,737,001 | 4/1988 | Moss | 340/435 |
| 4,804,836 | 2/1989 | Iino | 345/7 |
| 4,936,642 | 6/1990 | Hung et al. | 350/3.81 |
| 4,941,263 | 7/1990 | Hirshberg | 340/435 |
| 5,070,323 | 12/1991 | Iino et al. | 345/7 |
| 5,146,407 | 9/1992 | Motohashi | 340/457.3 |
| 5,200,844 | 4/1993 | Suvada | 349/9 |
| 5,210,626 | 5/1993 | Kumayama et al. | 345/9 |
| 5,219,413 | 6/1993 | Lineberger | 340/457.3 |
| 5,231,379 | 7/1993 | Wood et al. | 345/9 |

FOREIGN PATENT DOCUMENTS 62-34824  2/1987  Japan.
3109925 11/1991  Japan.

*Primary Examiner*—Richard Hjerpe
*Assistant Examiner*—Chanh Nguyen
*Attorney, Agent, or Firm*—Cushman, Darby & Cushman

[57] ABSTRACT

A vehicular extreme position display system displays a stereoscopic image of a three-dimensional object near a vehicular extreme position. The system provides different levels in brightness on the displayed stereoscopic image to enhance the stereoscopic effect. The displayed stereoscopic image may be arranged to change in color and brightness depending on monitored background illuminance. Further, the display of the stereoscopic image may be arranged to automatically terminate when a preset condition is matched.

9 Claims, 6 Drawing Sheets

VEHICULAR EXTREME POSITION DISPLAY SYSTEM

BACKGROUND OF THE INVENTION

1. Field of the Invention

The present invention relates to a vehicular extreme position display system which enables a driver in a vehicular compartment to visually observe or confirm a vehicular extreme position such as a vehicular front end position, by forming a virtual image of a particular object near the vehicular extreme position using proper optical displaying means.

2. Description of the Prior Art

Vehicular extreme position display systems employing the head-up displays are known as disclosed in such as Japanese First (unexamined) Patent Publication No. 62-34824.

In this publication, a virtual image of a flat or planar object arranged in the vehicle is formed near a front end of the vehicle in a driver's field of view through a windshield glass, using optical displaying means. By viewing this image, the driver confirms a vehicular front end position, particularly a positional relationship between the vehicular front end position and an obstacle, such as, a wall, which is otherwise difficult to observe.

However, in this publication, since the formed image observed by the driver is flat or two-dimensional, the driver compares the two-dimensional image and the obstacle to estimate a positional relationship between the vehicular front end position and the obstacle when approaching the obstacle. This raises a problem in that the driver finds it difficult to estimate such a positional relationship since there is only one matching point between the two-dimensional image and a surface of the obstacle in a direction toward the driver's view point. In addition, the two-dimensional image tends to cause recognition of different displayed positions thereof according to the individual observers, i.e. the individual drivers.

SUMMARY OF THE INVENTION

Therefore, it is an object of the present invention to provide an improved vehicular extreme position display system that can eliminate the above-noted defects inherent in the prior art.

To accomplish the above-mentioned and other objects, one aspect of the present invention provides a vehicular extreme position display system comprising optical displaying means; a three-dimensional object to be projected by the optical displaying means so as to form a stereoscopic image thereof near a vehicular extreme position; the three-dimensional object having means for providing different levels in brightness on the image.

Another aspect of the present invention provides a vehicular extreme position display system comprising optical displaying means; a three-dimensional object to be projected by the optical displaying means so as to form a stereoscopic image thereof near a vehicular extreme position; the optical displaying means including means for detecting illuminance around the vehicular extreme position; means for selecting a displaying color of the stereoscopic image depending on the illuminance as detected by the detecting means; and means for setting the displaying color of the stereoscopic image as selected by the selecting means.

Still another aspect of the present invention provides a vehicular extreme position display system comprising optical displaying means; a three-dimensional object to be projected by the optical displaying means so as to form a stereoscopic image thereof near a vehicular extreme position; the optical displaying means including means for detecting illuminance around the vehicular extreme position; and means for controlling luminance of the stereoscopic image depending on the illuminance as detected by the detecting means.

A further aspect of the present invention provides a vehicular extreme position display system comprising optical displaying means; a three-dimensional object to be projected by the optical displaying means so as to form a stereoscopic image thereof near a vehicular extreme position; and means for automatically deactivating the optical displaying means when a preset condition is matched.

BRIEF DESCRIPTION OF THE DRAWINGS

The present invention will be understood more fully from the detailed description given hereinbelow and from the accompanying drawings of the preferred embodiments of the invention, which are given by way of example only, and are not intended to be limitative of the present invention.

In the drawings.

DESCRIPTION OF THE PREFERRED EMBODIMENT

Now, preferred embodiments of the present invention will be described with reference to the drawings.

Figure 1:
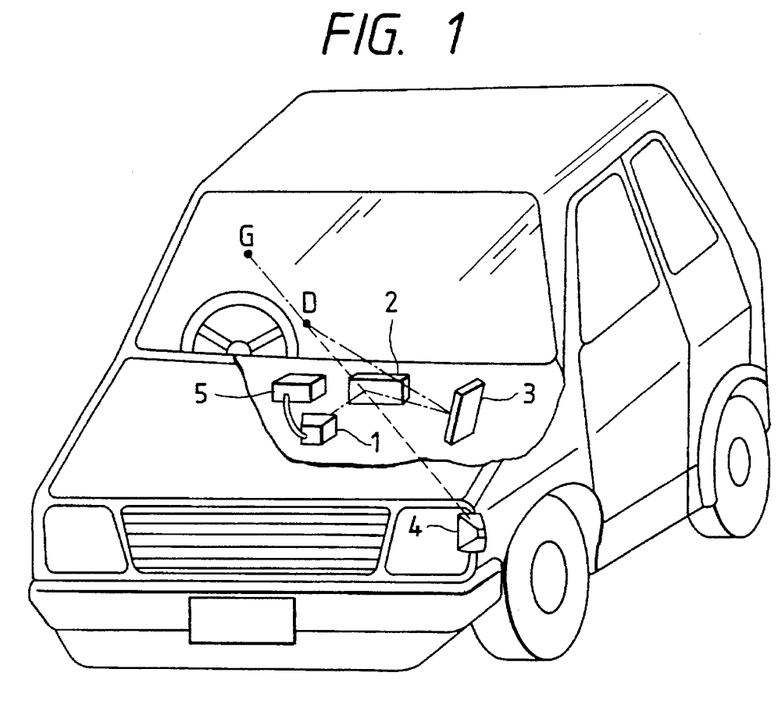
FIG. 1 is a schematic perspective view showing a structure of a vehicular extreme position display system according to a first preferred embodiment of the present invention.

FIG. 1 schematically shows a structure of the vehicular extreme position display system according to the first preferred embodiment of the present invention, wherein the vehicular extreme position is a vehicular front end position.

In FIG. 1, light emitted from a display unit 1 is reflected by a pair of reflecting mirrors 2 and 3 to reach a point D on a front windshield glass. The light is then reflected at the point D to enter a driver's eyes, i.e. to reach a driver's view point G.

Figure 2:
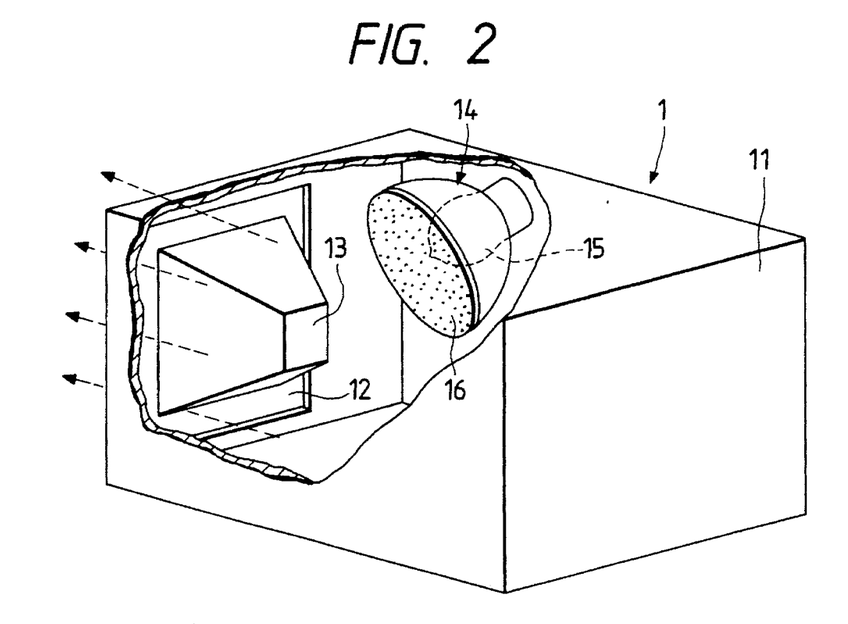
FIG. 2 is a schematic perspective view showing a structure of a display unit employed in the vehicular extreme position display system of FIG. 1.

As shown in FIG. 2, the display unit 1 includes a box-shaped casing 11. The casing 11 has a transparent section formed by a transparent plate 12 which is fixed at a square opening of the casing 11. A three-dimensional object 13 is fixed to the transparent plate 12 substantially at its middle portion. A light source 14 is further arranged in the casing 11 so as to emit the light toward the transparent plate 12 and surfaces of the three-dimensional object 13 obliquely from upward.

The three-dimensional object 13 is made of, such as, a metal or a synthetic resin, and formed into a shape of a polyhedron, such as, a frustum of quadrangular pyramid as shown. Specifically, in this preferred embodiment, the shape of the three-dimensional object 13 is selected so as to provide natural shading contrast on surfaces of a projected image thereof when receiving the light from the light source 14 obliquely from upward. By means of the shading contrast, ridge lines of the three-dimensional object 13, i.e., sides thereof, will clearly appear on the projected image thereof. The light source 14 includes a halogen lamp 15 with a reflector and further includes a light diffusing plate 16, such as, a ground glass in front of the lamp 15.

The display unit 1 is disposed in a space partitioned by a dash board from a passenger's compartment. As shown in FIG. 1, the light from the display unit 1 representing a stereoscopic or three-dimensional image of the three-dimensional object 13 is reflected by the pair of the reflecting mirrors 2 and 3 to reach the point D on the windshield glass, where the light is reflected to reach the driver's view point G. As a result, the stereoscopic image 4 of the three-dimensional object 13 is formed on a straight line passing the driver's view point G and the point D. A distance between the point D and the stereoscopic image 4 becomes equal to a distance the light travels from the display unit 1 to the point D via the reflecting mirrors 2 and 3. Accordingly, in this preferred embodiment, positions of the display unit 1 and the reflecting mirrors 2 and 3 are adjusted so that the stereoscopic image 4 appears slightly forward of a left front end of the vehicle.

Figure 3:
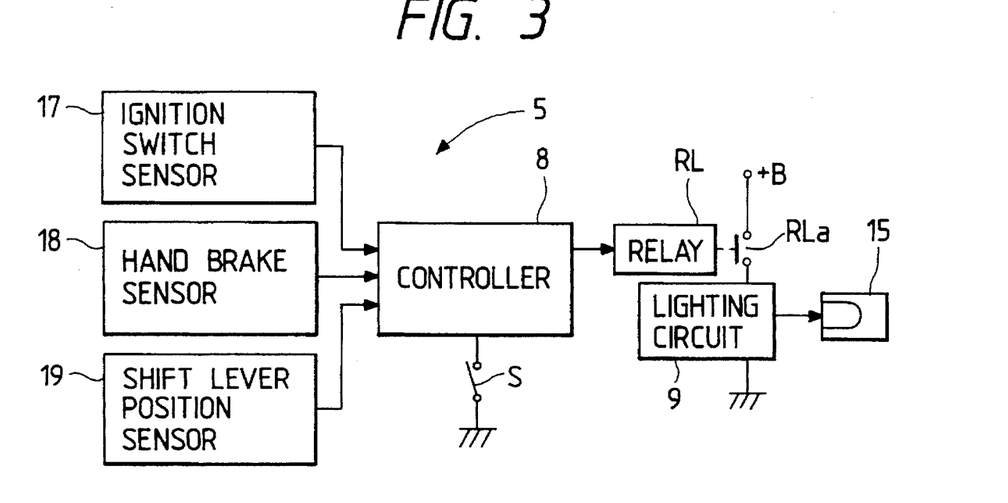
FIG. 3 is a block diagram of a control circuit.

FIG. 3 shows a block diagram of a control circuit 5 as shown in FIG. 1. The control circuit 5 controls activation and deactivation of the halogen lamp 15. Specifically, in FIG. 3, a controller 8 energizes a relay RL to close a contact RLa so as to activate the halogen lamp 15 via a lighting circuit 9 when a switch S is turned on by the driver. On the other hand, the controller 8 deenergizes the relay RL to open the contact RLa so as to deactivate the halogen lamp 15 based on a sensor signal from an ignition switch sensor 17, a hand brake sensor 18 or a gear shift lever position sensor 19, or a time-up signal from a built-in timer.

The vehicular extreme position displaying system according to the first preferred embodiment operates as follows:

When, for example, parking the vehicle, the driver turns on the switch S so that the relay RL is energized by the controller 8 to activate the halogen lamp 15 of the display unit 1.

The light emitted from the display unit 1 representing the stereoscopic image of the three-dimensional object 13 advances to the reflecting mirror 2 to be reflected thereat toward the reflecting mirror 3. The light is then reflected by the reflecting mirror 3 toward the point D on the front glass, where the light is further reflected to reach the driver's view point G. As a result, the driver can see, through the front glass, the stereoscopic image 4 of the three-dimensional object 13 as floating at a position slightly forward of the vehicular left front end. As described above, since the stereoscopic image 4 has the shading contrast thereon, i.e. different levels in brightness thereon, the stereoscopic image 4 is clearly observed by the driver as having a depth or length in a direction toward the driver's view point G.

Figure 4:
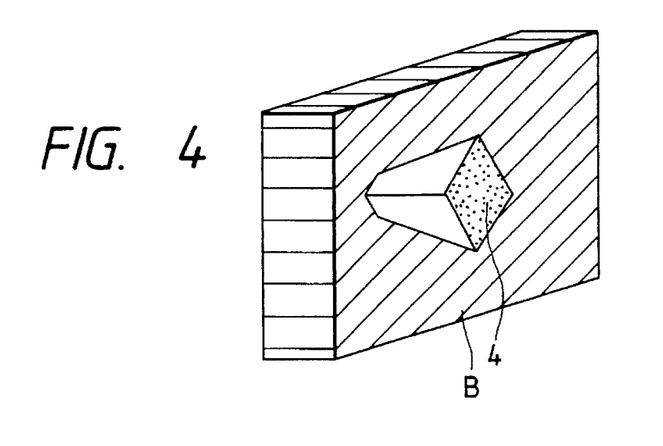
FIG. 4 is a perspective view showing a positional relationship between a stereoscopic image and an obstacle.
Figure 5:
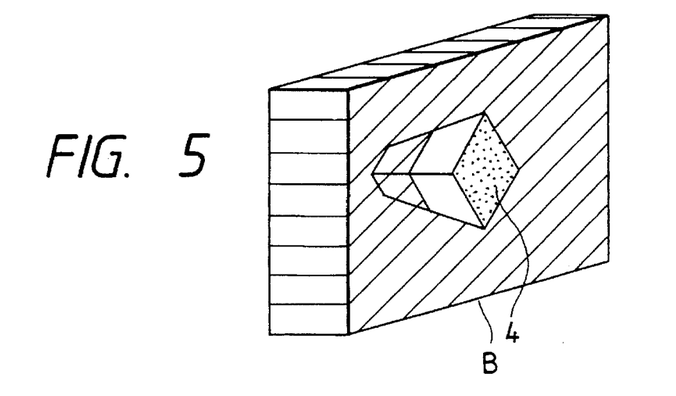
FIG. 5 is a perspective view showing a positional relationship between the stereoscopic image and the obstacle.
Figure 6:
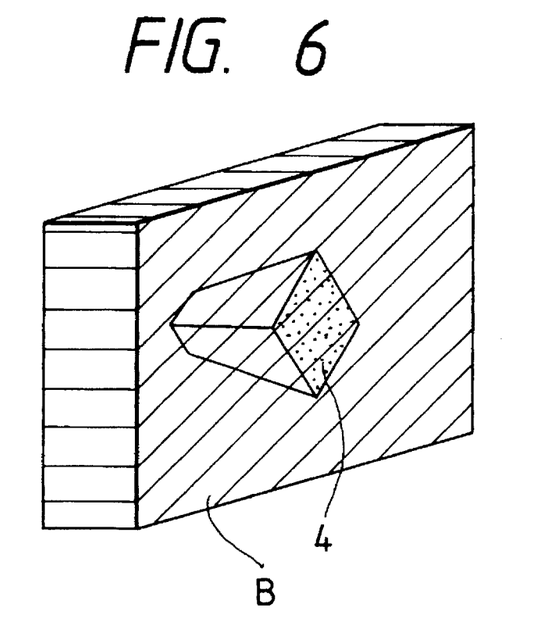
FIG. 6 is a perspective view showing a positional relationship between the stereoscopic image and the obstacle.

When the vehicle approaches the obstacle, such as, the wall B from a position relatively remote therefrom, the stereoscopic image 4 is observed by the driver in its entirety as floating at a driver's side relative to a confronting surface of the wall B, as shown in FIG. 4. On the other hand, when the vehicle approaches closer to the wall B, the stereoscopic image 4 is observed by the driver such that a front side thereof seems to have entered the wall B, i.e. the front side thereof is overlapped with the confronting surface of the wall B, and the remaining portion of the stereoscopic image 4 is positioned at the driver's side, as shown in FIG. 5. When the vehicle approaches further closer to the wall B, the stereoscopic image 4 is observed by the driver as having entered the wall B in its entirety, i.e. the stereoscopic image 4 is overlapped with the wall B in its entirety, as shown in FIG. 6.

As appreciated, since the stereoscopic image 4 is observed by the driver in distinctly different manners depending on the positional relationship between the stereoscopic image 4 and the obstacle B, the driver can easily estimate the vehicular front end position relative to the obstacle B by observing the stereoscopic image 4 so as to park the vehicle at a desired position relative to the obstacle B.

When a gear shift lever is shifted to a parking position as monitored by the shift lever position sensor 19, or when a hand brake is applied as monitored by the hand brake sensor 18, or when an ignition switch is turned off as monitored by the ignition switch sensor 17, the controller 8 deenergizes the relay RL to open the contact RLa so as to turn off the halogen lamp 15 of the display unit 1. As described before, the controller 8 may automatically turn off the halogen lamp 15 after lapse of a time period preset in the built-in timer.

Figure 7:
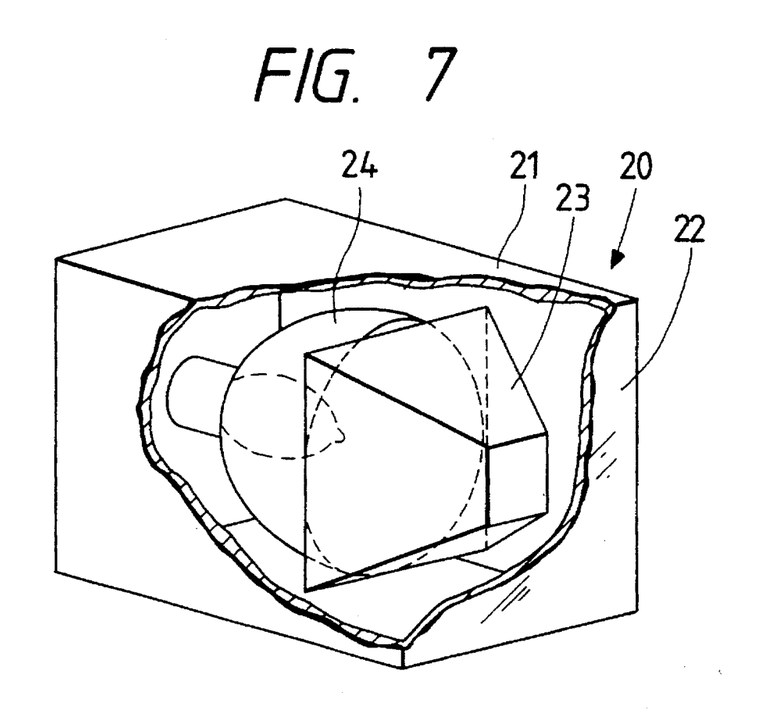
FIG. 7 is a schematic perspective view showing a display unit according to a second preferred embodiment of the present invention.

Now, the second preferred embodiment of the present invention will be described hereinbelow. In the second preferred embodiment, the display unit 1 in the first preferred embodiment is replaced by a display unit 20 as shown in FIG. 7. The other structure of the second preferred embodiment is the same as that of the first preferred embodiment.

In FIG. 7, a transparent plate 22, such as, a glass plate is fixed at a front side of a casing 21 with respect to an advancing direction of the light emitted from the light source (hereinafter, directional terms are defined with respect to the light advancing direction). In the casing 21, a three-dimensional object 23 is arranged backward of the transparent plate 22, and a light source 24 is arranged backward of the three-dimensional object 23.

Figure 8:
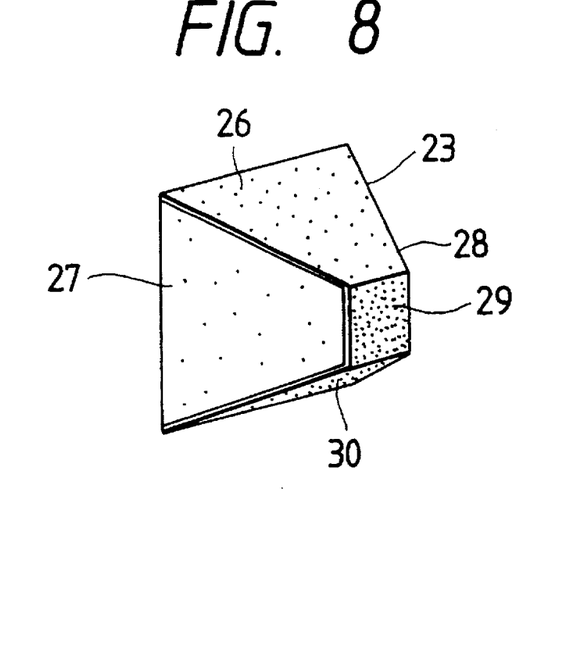
FIG. 8 is a perspective view of a three-dimensional object employed in the display unit of FIG. 7.

As shown in FIG. 8, the three-dimensional object 23 is formed into a frustum of quadrangular pyramid having semitransparent surfaces (light diffusion surfaces) so as to allow the light from the light source 24 to directly pass therethrough. Accordingly, in order to provide natural shading contrast on the projected image thereof, light transmittance is set to be different in level among the surfaces of the three-dimensional object 23. Specifically, in this preferred embodiment, the light transmittance of a right side surface is set to be the highest and decreases in the order of an upper surface, a front surface, a bottom surface and a left side surface as shown in FIG. 8, so as to provide the shading contrast on the projected image corresponding to an arrangement where the light is emitted to the three-dimensional object 23 obliquely from upper right.

When the display unit 20 having the foregoing structure is used to project an image of the three-dimensional object 23, a stereoscopic image thereof having the natural shading contrast is displayed as in the first preferred embodiment. Further, since the light emitted from the light source 24 is directly transmitted through the three-dimensional object 23 in case of the display unit 20, a lower quantity of light is acceptable in comparison with the first preferred embodiment so that a lamp having lower power consumption can be employed in the light source 24.

The three-dimensional object 23 having different levels in light transmittance among the surfaces thereof can be produced in the following manners:

When providing the required levels in light transmittance simultaneously with forming the three-dimensional object 23, a mold for light transparency resin or glass is crimp-processed with different crimping degrees, i.e. different sizes and/or densities of crimps among surfaces of the mold. As a result, a molded product, i.e. the three-dimensional object 23 has different scattering degrees among the surfaces thereof so as to provide the required shading contrast on the projected image.

On the other hand, when providing the required levels in light transmittance by post-forming process, the following ways are available.

(1) As shown in FIG. 8, mat films 26, 27, 28, 29 and 30 having different light scattering degrees thereamong are bonded to the corresponding surfaces of a molded transparent product, such as, a molded transparent resinous product or a molded transparent glass product so as to form the three-dimensional object 23.

Figure 9:
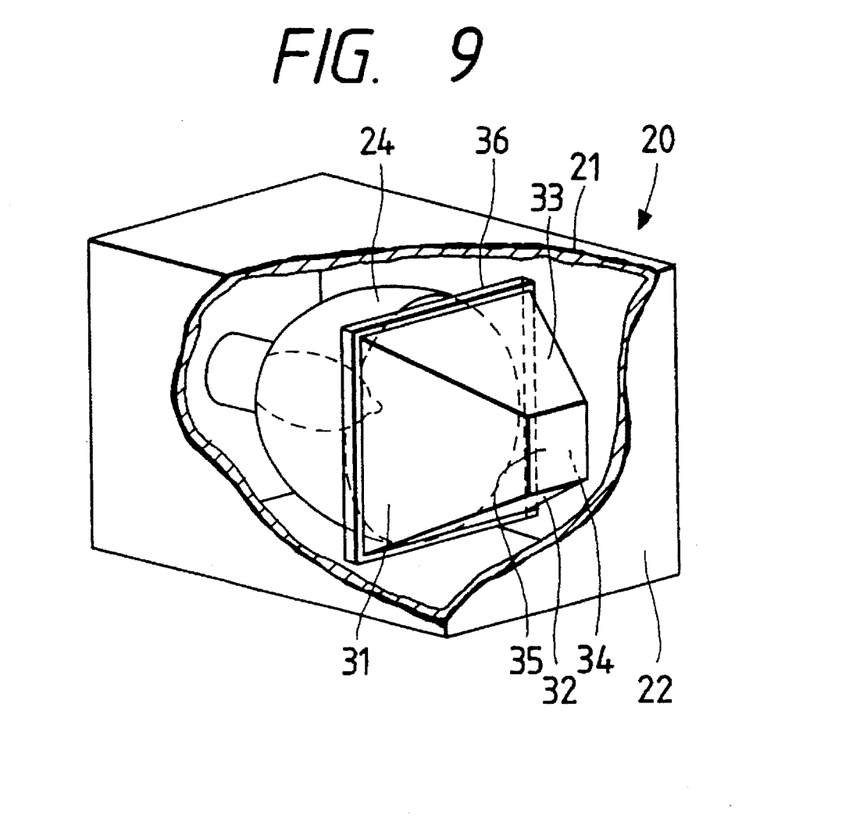
FIG. 9 is a schematic perspective view showing a modification of the display unit of FIG. 7.

(2) As shown in FIG. 9, films 31, 32, 33, 34 and 35 having different levels in light transmittance thereamong are bonded to the corresponding surfaces of the molded transparent product to form the three-dimensional object 23. In this case, a light scattering plate 36 such as a ground glass plate is interposed between the light source 24 and the three-dimensional object 23.

(3) Screen printing is performed so as to provide different light scattering degrees such as in the form of mat among surfaces of the molded transparent product.

(4) Shot blasting is performed onto surfaces of the molded transparent resinous product. By changing shot degrees among the surfaces, different light scattering degrees are provided among the surfaces to realize the required shading contrast on the projected image.

(5) A grinding process is performed to surfaces of the molded transparent glass product using hydrogen fluoride. By changing grinding degrees among the surfaces, the required shading contrast is realized on the projected image.

By means of the foregoing processing, the three-dimensional object 23 having different levels in light transmittance is produced. Further, the post-forming processing as described above may also be applied to the three-dimensional object formed by bonding plate-like members.

Further, the ridge lines, i.e. the sides of the three-dimensional object may clearly appear on the projected image by printing opaque lines on the respective sides thereof or by bonding tapes on the respective sides thereof. Moreover, the sides of the three-dimensional object may also clearly appear on the projected image by bonding films of different colors on the respective surfaces thereof.

Now, the third preferred embodiment will be described hereinbelow with reference to FIGS. 10 to 12. In the third preferred embodiment, the projected image of the three-dimensional object changes in luminance and color depending on the background illuminance so as to enable the driver to easily observe the projected image relative to the obstacle.

Figure 10:
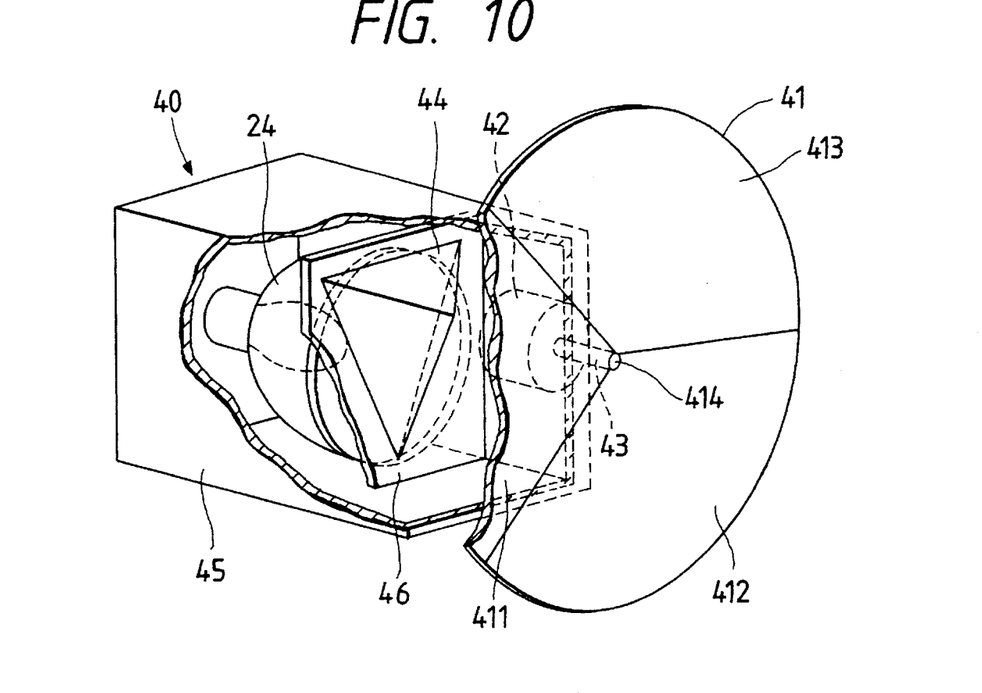
FIG. 10 is a schematic perspective view showing a display unit according to a third preferred embodiment of the present invention.

FIG. 10 schematically shows a display unit 40 which corresponds to the display units 1 and 20 in the first and second preferred embodiments. In FIG. 10, the display unit 40 includes a casing 45 which includes therein a three-dimensional object 44 and the light source 24 for emitting the light onto the three-dimensional object 44. A motor 42 is provided at a side of the casing 45. A color filter 41 is further provided just forward of the three-dimensional object 44 and supported at its center 414 by an output shaft 43 which transmits a rotational force of the motor 42 so as to rotate the color filter 41. The motor 42 is in the form of such as a step motor and fixed to the casing 45 by screws or bonding.

The color filter 41 is of a disc-like shape and made of transparent resin. The color filter 41 is arranged at a position where the light emitted from the light source 24 and having passed through the three-dimensional object 44 passes. The color filter 41 has three colored filters, i.e. a green filter 411, a red filter 412 and a blue filter 413 each having a fan shape and having the same area as each other. The light emitted from the light source 24 and transmitted through the three-dimensional object 44 passes through one of the three colored filters so as to be colored by the corresponding filter.

Figure 11:
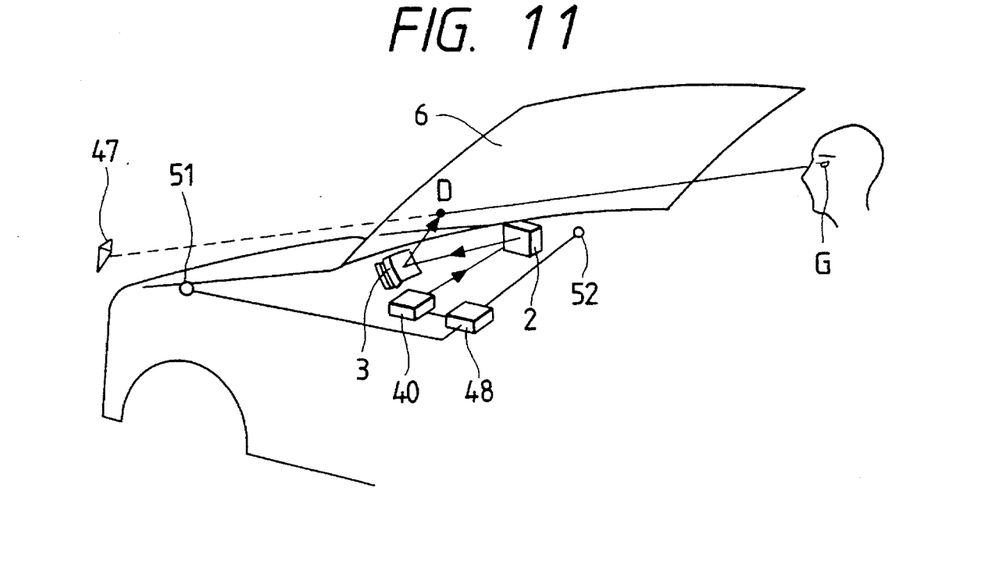
FIG. 11 is a diagram showing a structure of a vehicular extreme position display system according to the third preferred embodiment of the present invention.
Figure 12:
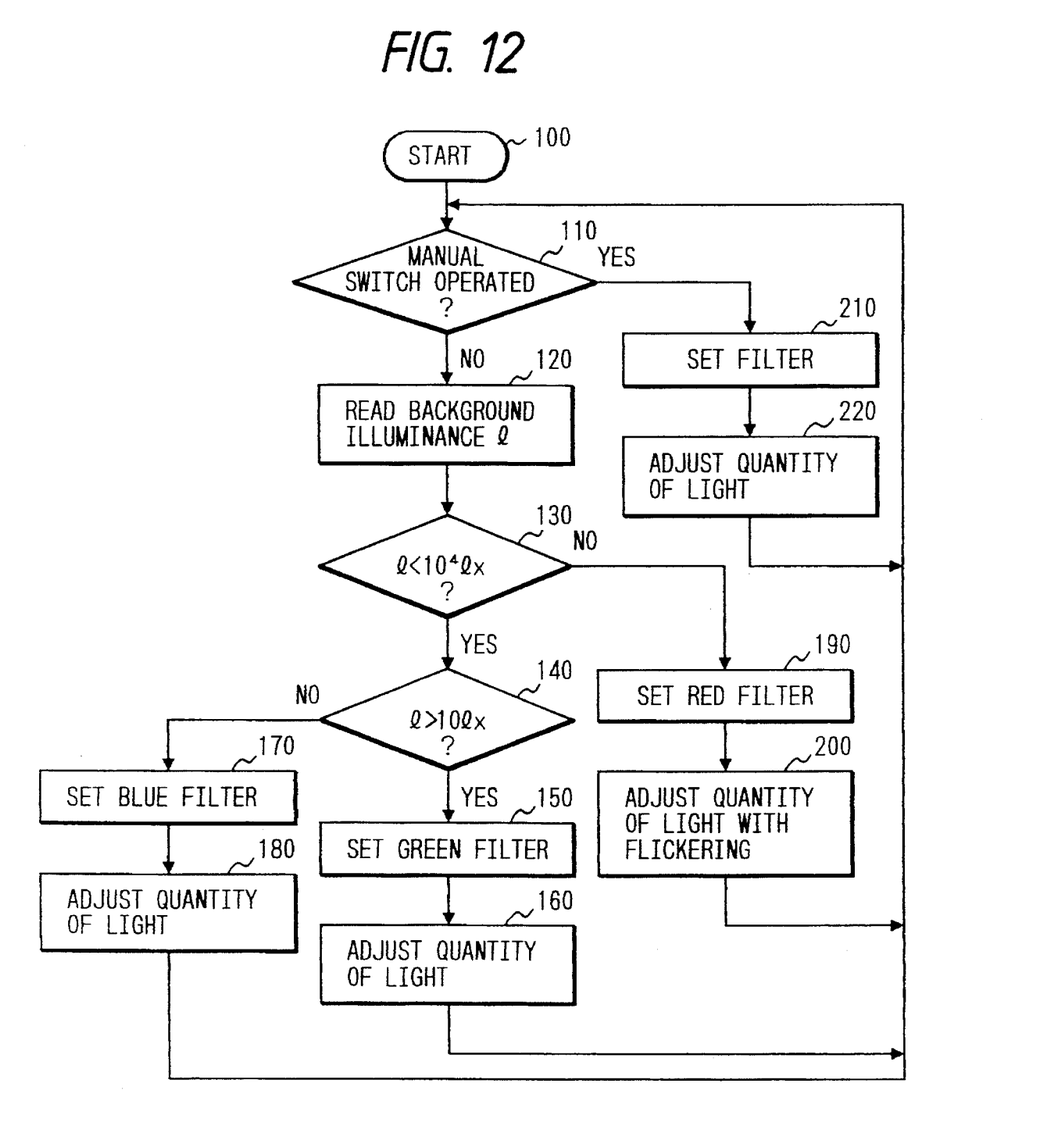
FIG. 12 is a flowchart showing a routine to be executed by a control circuit according to the third preferred embodiment of the present invention.

As shown in FIG. 11, the light from the display unit 40 representing a stereoscopic image of the three-dimensional object 44 is guided by the reflecting mirrors 2 and 3 to reach the point D on the front glass. The light is reflected at the point D and then reaches the driver's view point G, so that the driver can see the stereoscopic image 47 slightly forward of the vehicular front left end as in the first and second preferred embodiments. A control circuit 48 is connected to the display unit 40. A photo sensor 51 for monitoring brightness around the vehicular front left end, i.e. the background illuminance therearound and a manual switch 52 to be operated by the driver to change the color and the luminance of the projected image 47 are further provided, which are respectively connected to the control circuit 48.

In this preferred embodiment, the three-dimensional object 44 may have a constant level in light transmittance among the surfaces thereof, or may have different levels in light transmittance as in the second preferred embodiment.

Now, operations of the third preferred embodiment will be described with reference to a flowchart of FIG. 12 to be executed by the control circuit 48.

When this routine starts at a step 100 by means of, for example, the switch S in FIG. 3, a step 110 checks whether the manual switch 52 is operated by the driver. If answer at the step 110 is NO, the routine proceeds to a step 120 where a background illuminance value l as monitored by the photo sensor 51 is read in. Subsequently, a step 130 determines whether the monitored background illuminance value l is less than a first preset value $10_L{}^4$. If the answer at the step 130 is NO, i.e. the monitored illuminance value l is equal to or greater than the first preset value, the routine proceeds to a step 190 as determining that the background illuminance is high. On the other hand, if the answer at the step 130 is YES, i.e. the monitored illuminance value l is less than the first preset value, the routine proceeds to a step 140 which determines whether the monitored background illuminance value l is greater than a second preset value $10_l$. If answer at the step 140 is NO, i.e. the monitored background illuminance value l is equal to or less than the second preset value, the routine goes to a step 170 as determining that the background illuminance is low, such as, in the twilight. On the other hand, if answer at the step 140 is YES, i.e. the monitored background illuminance value l is greater than the second preset value, the routine goes to a step 150 as determining that the background illuminance is normal.

At the step 150, the control circuit 48 drives the motor 42 so that the green filter 411 comes to a position to receive the light from the three-dimensional object 44. Subsequently, the routine proceeds to a step 160 where a quantity of light from the light source 24 is automatically increased by the control circuit 48 when the background illuminance as monitored by the photo sensor 51 is large, and decreased when the monitored background illuminance is small. Specifically, the step 160 uses a prestored characteristic map which defines a linear function between the background illuminance and the quantity of light so as to adjust the quantity of light from the light source 24 to provide the luminance of the projected image 47 in the range between 1500 cd/m$^2$ and 3000 cd/m$^2$.

On the other hand, at the step 170, the control circuit 48 drives the motor 42 so that the blue filter 413 comes to the position to receive the light from the three-dimensional object 44. Subsequently, the routine proceeds to a step 180 where a quantity of light from the light source 24 is automatically controlled depending on the monitored background illuminance as at the step 160. Specifically, the step 180 uses a prestored characteristic map which defines a linear function between the background illuminance and the quantity of light so as to adjust the quantity of light from the light source 24 to provide the luminance of the projected image 47 in the range equal to or less than 1500 cd/m$^2$. At the twilight time, the Purkinje phenomenon is generated as the human visual characteristic so that the driver has the maximum visual sensitivity to the color blue. As a result, the visibility for the projected stereoscopic image 47 is highly improved to cause the sides of the three-dimensional object 44 to clearly appear on the projected image 47. The lowering of the quantity of light makes the driver easily observe the projected image 47 relative to the obstacle in the monitored background illuminance, and further contributes toward reducing the power consumption.

On the other hand, at the step 190, the control circuit 48 drives the motor 42 so that the red filter 412 comes to the position to receive the light from the three-dimensional object 44. Subsequently, the routine proceeds to a step 200 where a quantity of light from the light source 24 is automatically controlled depending on the monitored background illuminance as at the step 160. Specifically, the step 200 uses a prestored characteristic map which defines a linear function between the background illuminance and the quantity of light so as to adjust the quantity of light from the light source 24 to provide the luminance of the projected image 47 in the range equal to or greater than 3000 cd/m$^2$. Further, at the step 200, the control circuit 48 controls the light source 24 to emit the flickering light with frequencies between 3 Hz and 20 Hz. This range of frequencies makes the driver's visibility the maximum. As appreciated, when the monitored background illuminance is high, the color red which is the most distinctive relative to the high background illuminance is selected, and further the quantity of light from the light source 24 is increased to match the high background illuminance and further with the flickering. This makes the sides of the three-dimensional object 44 clearly appear on the projected stereoscopic image 47 to improve the visibility thereof. In addition, the flickering of the light reduces the effective power consumption.

Referring back to the step 110, if the answer at the step 110 is YES, i.e. the manual switch 52 is operated by the driver, the routine proceeds to steps 210 and 220 where the color and the quantity of light are adjusted according to the driver's preference.

After executing one of the steps 160, 180, 200 and 220, the routine returns to the step 110 to repeat the foregoing execution of the steps.

Instead of the color filter 41, a single primary color filter employed in a liquid crystal color television may be employed so as to electrically switch the color among red, green and blue.

In the foregoing first to third preferred embodiments, the reflecting mirrors 2 and 3 are respectively in the form of plane mirrors. However, concave mirrors may be employed for the reflecting mirrors 2 and 3 so as to shorten the respective distances between the display unit and the reflecting mirror 2, between the reflecting mirrors 2 and 3 and between the reflecting mirror 3 and the point D for providing reduction in size of the optical system.

For example, in FIG. 1, assuming that the reflecting mirror 3 is in the form of the concave mirror and that a focal length of the concave mirror is f, a distance between the display unit 1 and the reflecting mirror 2 is a, a distance between the reflecting mirrors 2 and 3 is b, a distance between the reflecting mirror 3 and the point D is c, a distance between the point D and the projected stereoscopic image 4 is L, and a distance between the reflecting mirror 3 and the projected stereoscopic image 4 is d, the following relationship is established:

$$1/d = 1/(a+b) - 1/f$$

$$L = d + c$$

Further, although the stereoscopic image of the three-dimensional object is displayed near the vehicular front left end in the foregoing first to three preferred embodiments, the stereoscopic image may be displayed near a vehicular front right end by changing the positional relationship among the display unit and the reflecting mirrors. Further, the stereoscopic image may be displayed near a vehicular rear end by providing the display unit and the optical system at a vehicular rear tray portion and by reflecting the image carrying light at a point on a rear glass.

It is to be understood that this invention is not to be limited to the preferred embodiments and modifications described above, and that various changes and modifications may be made without departing from the spirit and scope of the invention as defined in the appended claims.

What is claimed is:

1. A vehicular extreme position display system in which an image of a display object is formed on a transparent member arranged at a front side of a vehicle so as to be displayed near an extreme position of the vehicle, thereby allowing an estimation of a distance between the image of the display object and an obstacle located forward of the vehicle for judging a distance between the extreme position of the vehicle and the obstacle, said vehicular extreme position display system comprising:

optical displaying means; and said display object which is three-dimensional and in the form of a polyhedron having a plurality of surfaces and ridge lines between said surfaces;

wherein said optical displaying means includes light emitting means backward of said display object so that said display object transmits therethrough light emitted from said light emitting means;

wherein said display object includes light-transmittance changing means for providing different light-transmittance levels between at least some of said plurality of surfaces so that the image of the display object represented by the light having passed through said display object bears shading contrast and is thus formed on said transparent member as a stereoscopic image having the shading contrast, and wherein said display object is in the form of a frustum of quadrangular pyramid, and wherein said light-transmittance changing means decreases the light transmittance of the display object in the order of one of right and left side surfaces, an upper surface, a front surface, a bottom surface and the other of the right and left side surfaces with respect to an advancing direction of the light emitted from said light emitting means.

2. The system as set forth in claim 1, wherein said light-transmittance changing means is provided by forming said display object in a mold which is crimp-processed with different crimping degrees among surfaces of the mold, and wherein the crimping degrees increase in the order of one of right and left side surfaces, an upper surface, a front surface, a bottom surface and the other of the right and left side surfaces of the mold so as to provide said light-transmittance changing means which decreases the light transmittance of the display object in said order of the surfaces of the display object.

3. The system as set forth in claim 1, wherein said light-transmittance changing means is provided by processing said display object by shot blasting with different shot degrees among the surfaces thereof, and wherein the shot degrees increase in the order of one of the right and left side surfaces, the upper surface, the front surface, the bottom surface and the other of the right and left side surfaces.

4. The system as set forth in claim 1, wherein said light-transmittance changing means is provided by grinding said display object at different grinding degrees among the surfaces thereof, and wherein the grinding degrees increase in the order of one of the right and left side surfaces, the upper surface, the front surface, the bottom surface and the other of the right and left side surfaces.

5. A vehicular extreme position display system in which an image of a display object is formed on a transparent member arranged at a front side of a vehicle so as to be displayed near an extreme position of the vehicle, thereby allowing an estimation of a distance between the image of the display object and an obstacle located forward of the vehicle for judging a distance between the extreme position of the vehicle and the obstacle, said vehicular extreme position display system comprising:

optical displaying means; and said display object which is three-dimensional and in the form of a polyhedron having a plurality of surfaces and ridge lines between said surfaces;

wherein said optical displaying means includes light emitting means backward of said display object so that said display object transmits therethrough light emitted from said light emitting means;

wherein said display object includes light-transmittance changing means for providing different light-transmittance levels between at least some of said plurality of surfaces so that the image of the display object represented by the light having passed through said display object bears shading contrast and is thus formed on said transparent member as a stereoscopic image having the shading contrast, and wherein said light-transmittance changing means is provided by forming said display object in a mold which is crimp-processed with different crimping degrees among surfaces of the mold.

6. A vehicular extreme position display system in which an image of a display object is formed on a transparent member arranged at a front side of a vehicle so as to be displayed near an extreme position of the vehicle, thereby allowing an estimation of a distance between the image of the display object and an obstacle located forward of the vehicle for judging a distance between the extreme position of the vehicle and the obstacle, said vehicular extreme position display system comprising:

optical displaying means; and said display object which is three-dimensional and in the form of a polyhedron having a plurality of surfaces and ridge lines between said surfaces;

wherein said optical displaying means includes light emitting means backward of said display object so that said display object transmits therethrough light emitted from said light emitting means;

wherein said display object includes light-transmittance changing means for providing different light-transmittance levels between at least some of said plurality of surfaces so that the image of the display object represented by the light having passed through said display object bears shading contrast and is thus formed on said transparent member as a stereoscopic image having the shading contrast, and wherein said display object is made of a transparent resin, and wherein said light-transmittance changing means is provided by processing said display object by shot blasting with different shot degrees among the surfaces thereof.

7. A vehicular extreme position display system in which an image of a display object is formed on a transparent member arranged at a front side of a vehicle so as to be displayed near an extreme position of the vehicle, thereby allowing an estimation of a distance between the image of the display object and an obstacle located forward of the vehicle for judging a distance between the extreme position of the vehicle and the obstacle, said vehicular extreme position display system comprising:

optical displaying means; and said display object which is three-dimensional and in the form of a polyhedron having a plurality of surfaces and ridge lines between said surfaces;

wherein said optical displaying means includes light emitting means backward of said display object so that said display object transmits therethrough light emitted from said light emitting means;

wherein said display object includes light-transmittance changing means for providing different light-transmittance levels between at least some of said plurality of surfaces so that the image of the display object represented by the light having passed through said display object bears shading contrast and is thus formed on said transparent member as a stereoscopic image having the shading contrast, and wherein said display object is made of a transparent glass, and wherein said light-transmittance changing means is provided by grinding said display object at different grinding degrees among the surfaces thereof.

8. A vehicular extreme position display system in which an image of a display object is formed on a transparent member arranged at a front side of a vehicle so as to be displayed near an extreme position of the vehicle, thereby allowing an estimation of a distance between the image of the display object and an obstacle located forward of the vehicle for judging a distance between the extreme position of the vehicle and the obstacle, said vehicular extreme position display system comprising:

optical displaying means;

a three-dimensional object to be projected by said optical displaying means so as to form a stereoscopic image thereof near a vehicular extreme position;

said optical displaying means including:

means for detecting illuminance around the vehicular extreme position;

means for selecting a different displaying color of said stereoscopic image depending on the illuminance as detected by said detecting means; and         means for setting the displaying color of said stereoscopic image as selected by said selecting means.

9. The system as set forth in claim 8, wherein said optical displaying means includes light emitting means for emitting light onto said three-dimensional object, and wherein said setting means is arranged forward of said three-dimensional object in an advancing direction of said light so as to change a color of said light transmitted through said three-dimensional object to said selected displaying color.

\* \* \* \* \*